(12) United States Patent
Fu

(10) Patent No.: US 11,340,768 B2
(45) Date of Patent: May 24, 2022

(54) APPLICATION PROGRAM DISPLAY METHOD AND DEVICE, AND STORAGE MEDIUM

(71) Applicant: BEIJING XIAOMI MOBILE SOFTWARE CO., LTD., Beijing (CN)

(72) Inventor: Kaipeng Fu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/148,240

(22) Filed: Jan. 13, 2021

(65) Prior Publication Data

US 2021/0405856 A1 Dec. 30, 2021

(30) Foreign Application Priority Data

Jun. 30, 2020 (CN) .......................... 202010621754.4

(51) Int. Cl.
*G06F 3/04845* (2022.01)
*G06F 9/451* (2018.01)
*G06F 9/445* (2018.01)

(52) U.S. Cl.
CPC .......... *G06F 3/04845* (2013.01); *G06F 9/445* (2013.01); *G06F 9/451* (2018.02); *G06F 2203/04803* (2013.01)

(58) Field of Classification Search
CPC ...... G06F 3/04845; G06F 9/451; G06F 9/445; G06F 2203/04803
See application file for complete search history.

(56) References Cited

U.S. PATENT DOCUMENTS

| 6,230,318 | B1 * | 5/2001 | Halstead | G06F 8/20 717/108 |
|---|---|---|---|---|
| 9,578,093 | B1 * | 2/2017 | Gotoh | G06F 11/3006 |
| 9,723,245 | B2 * | 8/2017 | Lee | H04N 21/8106 |
| 10,444,948 | B2 * | 10/2019 | Kim | G06F 16/954 |
| 2004/0116813 | A1 * | 6/2004 | Selzer | A61B 8/463 600/467 |
| 2006/0195725 | A1 * | 8/2006 | Shah | G06F 11/3433 714/47.3 |

(Continued)

OTHER PUBLICATIONS

European Search Report in the European application No. 21151082.1, dated Jun. 15, 2021.

*Primary Examiner* — Tadesse Hailu
(74) *Attorney, Agent, or Firm* — Oblon, McClelland, Maier & Neustadt, L.L.P.

(57) ABSTRACT

The present disclosure relates to an application program display method and device, and a storage medium, which are applied to a terminal including a screen. The method can include determining whether an application screen supports activity-component-based in-application screen splitting. When the activity-component-based in-application screen splitting is supported and a screen splitting operation is detected, a first interface of the application program is displayed according to a first activity component of the application program, and a second interface of the application program is displayed according to a second activity component of the application program at same time of displaying the first interface. Both a display area of the first interface and a display area of the second interface can be less than a display area of the screen.

15 Claims, 5 Drawing Sheets

(56) References Cited

U.S. PATENT DOCUMENTS

| | | | |
|---|---|---|---|
| 2008/0115064 A1* | 5/2008 | Roach | G06F 3/0481 |
| | | | 715/730 |
| 2008/0117339 A1* | 5/2008 | Kirsche | H04N 5/45 |
| | | | 348/E5.112 |
| 2008/0126946 A1* | 5/2008 | Ueda | H04L 67/02 |
| | | | 715/733 |
| 2008/0306933 A1* | 12/2008 | Valliani | G06F 16/9577 |
| 2010/0081475 A1* | 4/2010 | Chiang | H04M 1/72403 |
| | | | 455/564 |
| 2010/0238286 A1* | 9/2010 | Boghossian | G08B 13/19697 |
| | | | 348/143 |
| 2013/0187861 A1* | 7/2013 | Lavallee | G06F 3/041 |
| | | | 345/173 |
| 2014/0351748 A1* | 11/2014 | Xia | G06F 3/0481 |
| | | | 715/798 |
| 2015/0074650 A1* | 3/2015 | Bennett | G06F 11/3688 |
| | | | 717/125 |
| 2015/0254998 A1* | 9/2015 | Daetwyler | G06F 3/1462 |
| | | | 434/262 |
| 2017/0364986 A1* | 12/2017 | Kim | G06Q 30/0201 |
| 2018/0121082 A1* | 5/2018 | Zhu | G06F 3/04847 |
| 2019/0073123 A1* | 3/2019 | Yang | G06F 3/04886 |
| 2019/0294433 A1* | 9/2019 | Dong | G06F 8/71 |
| 2019/0349635 A1* | 11/2019 | Wu | H04N 21/4316 |
| 2020/0057654 A1* | 2/2020 | Yang | G06F 8/65 |
| 2020/0125243 A1 | 4/2020 | Feng et al. | |
| 2020/0133487 A1* | 4/2020 | Zhang | G06F 3/04817 |
| 2020/0159289 A1* | 5/2020 | Seibert | G06F 1/1618 |
| 2020/0177726 A1* | 6/2020 | Zhang | G06F 3/0481 |
| 2020/0326820 A1* | 10/2020 | Walkin | G06F 3/04883 |
| 2020/0409541 A1* | 12/2020 | Luo | G06F 3/04845 |

\* cited by examiner

APPLICATION PROGRAM DISPLAY METHOD AND DEVICE, AND STORAGE MEDIUM

CROSS-REFERENCE TO RELATED APPLICATION

This application is filed based upon and claims priority to Chinese patent application No. 202010621754.4, filed on Jun. 30, 2020, the entire content of which is incorporated herein by reference.

TECHNICAL FIELD

The present disclosure generally relates to the technical field of interface displaying, including to an application program display method and device, and a storage medium.

BACKGROUND

Along with the development of sciences and technologies, devices with screens have been applied more and more extensively. However, an existing system program only supports screen splitting for different applications and cannot meet some special requirements of a user, for example, a screen splitting operation for different activity components in an application cannot be implemented, resulting in poor user experience.

SUMMARY

According to a first aspect of the present disclosure, an application program display method is provided which may be applied to a terminal including a screen. The method can include determining whether an application program supports activity-component-based in-application screen splitting. Further, in response to the activity-component-based in-application screen splitting being supported and a screen splitting operation being detected, a first interface of the application program is displayed according to a first activity component of the application program, and a second interface of the application program is displayed according to a second activity component of the application program at same time of displaying the first interface. Both a display area of the first interface and a display area of the second interface can be less than a display area of the screen.

According to a second aspect of the present disclosure, an application program display device is provided. The device can include a screen, a processor, and a memory that is configured to store instructions executable by the processor. The processor may be configured to implement the steps in any application program display method provided in the first aspect of the embodiments.

According to a third aspect of the present disclosure, a non-transitory computer-readable storage medium is provided. The instructions in the storage medium can be executed by a processor of a mobile terminal to cause the mobile terminal to execute any application program display method provided in the first aspect of the embodiments.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate exemplary embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
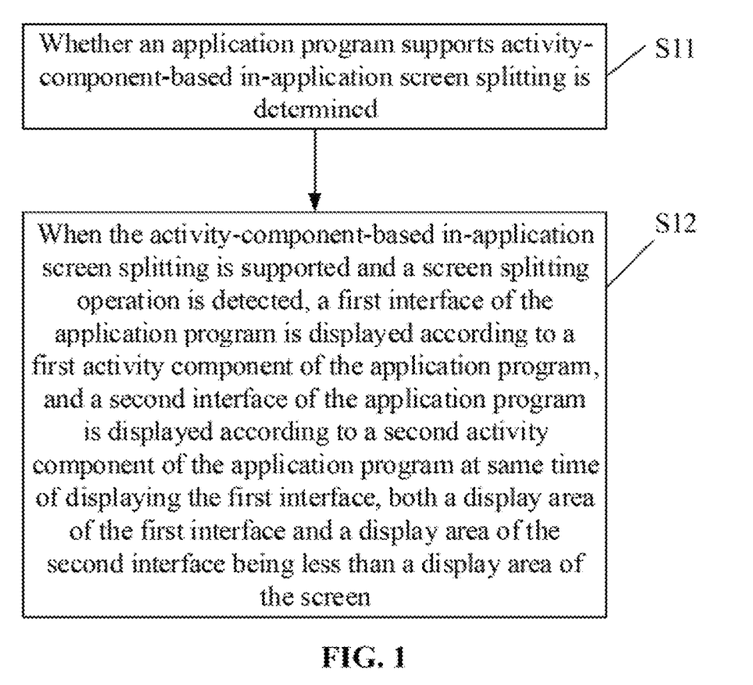
FIG. 1 is a flow chart showing an application program display method, according to an exemplary embodiment.

FIG. 1 is a flow chart showing an application program display method, according to an exemplary embodiment. As illustrated in FIG. 1, the application program display method is applied to a terminal including a screen, for example, a device with a screen like a smart phone, a tablet computer, a vehicle-mounted display terminal, a television and the like, and includes the following operations.

At step S11, whether an application program supports activity-component-based in-application screen splitting is determined. An existing terminal system only supports screen splitting for different applications and cannot meet some special requirements of a user. For example, a screen splitting operation for different activity components in an application cannot be implemented. When an activity component is started, a present activity component may be destroyed, and the activity component that is presently started may be displayed in a full-screen manner and may not be displayed at the same time with the previous activity component. For example, a native flow for Android may allow full-screen displaying of only one activity component, when another activity component is started, the present activity component may be destroyed, and in such case, the two activity components cannot be displayed at the same time.

However, more and more application software consists of multiple activity components at present, and thus simultaneous split-screen displaying of a main activity component and a sub activity component may undoubtedly bring great convenience to the user. Therefore, the present disclosure provides the application program display method. When an activity component is started, a present activity component may not be destroyed, an interface corresponding to the present activity component is kept in a display state, and interfaces corresponding to the two activity components may be displayed at the same time.

Herein, the activity component can be a visual interface for operations of the user. It provides a window for the user to complete an operation instruction and provides an interaction entry for the user to interact with the user. An application program may include no or multiple activity components. For example, an application program that runs in background and may not provide a user interface for the user may include zero activity component.

Screen splitting in an application can be applied to an application program with multiple activity components, and areas of all interfaces corresponding to the multiple activity components of the application program are less than an area of the screen, or, the areas of the display interfaces corresponding to the activity components corresponding to the application program may be adjusted. The application program of the embodiment may be any application program, such as a chat application, a payment application, a news application, a browser application or the like, installed in a device such as a smart phone, a tablet computer, a vehicle-mounted display terminal, a television or the like.

In the embodiments, whether the application program to be started supports activity-component-based in-application screen splitting is determined at first, that is, whether multiple activity components in the application program may be displayed at the same time on the screen when the application program is used.

In a further embodiment, the method can include, when an operating system of the terminal is started, a configuration file of supporting activity-component-based in-application screen splitting is loaded in a system memory, and the configuration file records information of an application program supporting activity-component-based in-application screen splitting. The information, recorded in the configuration file, of the application program supporting activity-component-based in-application screen splitting may include an identifier of the application program supporting activity-component-based in-application screen splitting; that is, a specific application that may support activity-component-based in-application screen splitting in the terminal. For example, an application A, an application B and an application C support activity-component-based in-application screen splitting.

The information recorded in the configuration file may further include a display area of an interface corresponding to an activity component of the application program supporting activity-component-based in-application screen splitting. For example, when the application is started, a display area of an interface corresponding to a main activity component that is displayed at first is equal to a display area of the screen; or, the display area of the interface corresponding to the main activity component that is displayed at first is less than the display area of the screen.

The information recorded in the configuration file may further include a display area of an interface corresponding to each activity component when multiple activity components of the application program supporting activity-component-based in-application screen splitting are displayed at the same time. The display areas of the interfaces corresponding to the multiple activity components may be less than or equal to the area of the whole screen. For example, after the application is started, during in-application screen splitting, a display area of the interface corresponding to one activity component is ⅓ of the display area of the screen, and a display area of the interface corresponding to another activity component is ⅔ of the display area of the screen.

Figure 2:
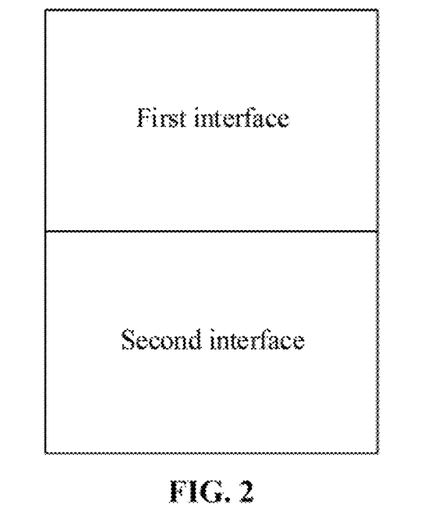
FIG. 2 is a first display interface of an application program, according to an exemplary embodiment.

The information recorded in the configuration file may further include a display region of each activity component when the multiple activity components of the application program supporting activity-component-based in-application screen splitting are displayed at the same time. For example, after the application is started, the display region of the main activity component that is displayed at first is an upper part of the screen or a left side of the screen; and during in-application screen splitting, the display region of one activity component is an upper half region of the screen, and the display region of another activity component is a lower half region of the screen, as illustrated in FIG. 2.

In the embodiments of the present disclosure, the configuration file may be a system-level configuration file, and when the application program is installed in the terminal, the operating system reads a configuration file or installation file of the application program to record information of the application program supporting in-application screen splitting in the system-level configuration file. The configuration file of the application program may include, but is not limited to, a manifest.xml file. For example, the manifest.xml file of the application program supporting in-application screen splitting is different from a manifest file of an application program which does not support in-application screen splitting.

Furthermore, a specific implementation flow of the operation at S11 that whether the application program supports activity-component-based in-application screen splitting is determined includes: when the application program is started, the configuration file is queried to determine whether the application program supports activity-component-based in-application screen splitting.

Exemplarily, when the application A is started, the configuration file is queried to determine whether the application A supports activity-component-based in-application screen splitting. If the configuration file records an identifier of the application A supporting activity-component-based in-application screen splitting, it is determined that the application A supports activity-component-based in-application screen splitting. It is unnecessary to access each application for confirmation, such that a response speed of the program may be increased.

Herein, querying of the configuration file and starting of the application program are executed concurrently, and querying and starting are implemented without mutual interferences, such that a starting speed of the application program may not be influenced. In addition, compared with analyzing a program package of the application program to determine whether the application program supports in-application screen splitting, querying the configuration file has the advantage that the determination efficiency is higher.

Optionally, the operation that the configuration file of supporting activity-component-based in-application screen splitting is loaded in the system memory when the operating system of the terminal is started includes: when the operating system of the terminal is started, according to the configuration file, identification information of the application program supporting activity-component-based in-application screen splitting is recorded in the system memory, and display areas of interfaces corresponding to multiple activity components in the application program are set.

Herein, the identification information of the application program may be a name of the application program, a serial number (SN) of the application program, or the like.

The display areas of the interfaces corresponding to the multiple activity components in the application program may include: the display area of the interface corresponding to the activity component when screen splitting is not executed after the application is started, and the display area of the interface corresponding to each activity component during in-application screen splitting.

Exemplarily, when the operating system of the terminal is started, according to the configuration file, position information of the application A, application B and application C supporting activity-component-based in-application screen splitting in the operating system is recorded in the system memory, and display areas of interfaces corresponding to multiple activity components in the application A, display areas of interfaces corresponding to multiple activity components in the application B and display areas of interfaces corresponding to multiple activity components in the application C are set.

Recording the identification information of the application program supporting activity-component-based in-application screen splitting in the configuration file may predetermine the application program supporting activity-component-based in-application screen splitting and make it unnecessary to confirm whether each application supports screen splitting when screen splitting is required, such that screen splitting response time is saved. After the application supporting in-application screen splitting is determined, the display areas of the interfaces corresponding to the multiple activity components in the application program are set, and the user does not need to set a display area of each display interface, such that operation time is saved for the user.

Optionally, when the terminal is in a landscape state or a portrait state, whether the application program supports activity-component-based in-application screen splitting is determined. In the embodiments, when the terminal is in both the landscape state and the portrait state, screen splitting may be executed, whether the application program supports activity-component-based in-application screen splitting may be determined, and when it is determined that in-application screen splitting may be executed, the user may operate a first interface for a screen splitting operation when the terminal is in the portrait or landscape state, such that user experience is improved.

Optionally, split-screen displaying is performed on the interfaces corresponding to the multiple activity components according to a screen splitting configuration in the terminal, and the screen splitting configuration is configured to indicate an application scenario of in-application screen splitting. For example, the screen splitting operation is executed in the landscape state, and the screen splitting operation may also be executed in the portrait state. Or, the screen splitting operation is executed in any application scenario of the terminal. The application scenario of in-application screen splitting of the terminal is not limited in the embodiments.

In addition, the screen splitting configuration of the embodiments may be adjusted according to a user input. The user may set the application scenario of the terminal during in-application screen splitting according to an own using habit, for example, setting the application scenario of in-application screen splitting of the terminal to be the portrait state. If the user does not adjust, in-application screen splitting may be executed by default when the terminal is in the landscape state.

In an embodiment, the method can include that whether the terminal is in the landscape state is determined.

Furthermore, a specific implementation flow of the operation at S11 that whether the started application program supports activity-component-based in-application screen splitting is determined includes, when the terminal is in the landscape state, whether the started application program supports activity-component-based in-application screen splitting is determined.

In the landscape state of the screen, a size of the display interface in a horizontal direction is relatively large. Correspondingly, in the screen splitting state, a display size of the display interface corresponding to each activity component is large and more consistent with a browsing or operating habit of the user, such that user experience may be improved. Therefore, in the embodiments, whether the terminal is in the landscape state may be determined at first, and when the terminal is in the landscape state, whether the started application program supports activity-component-based in-application screen splitting is determined.

At step S12, when the activity-component-based in-application screen splitting is supported and a screen splitting operation is detected, a first interface of the application program is displayed according to a first activity component of the application program, and a second interface of the application program is displayed according to a second activity component of the application program at same time of displaying the first interface, both a display area of the first interface and a display area of the second interface being less than a display area of the screen.

Herein, the first interface may be an interface displayed on the screen at first according to the first activity component of the application program when the application program supporting activity-component-based in-application screen splitting is started. For example, if the chat application A supports activity-component-based in-application screen splitting, when the application A is started, a chat list of the application A is displayed on the screen at first, and a display interface of the chat list is the first interface.

The first interface may also be an interface displayed according the first activity component of the application program and including multiple links after the application program supporting activity-component-based in-application screen splitting is started. For example, if a browser B supports activity-component-based in-application screen splitting, when the browser B is started, a search interface of the browser B is displayed on the screen at first, a list about information a is loaded when the information a is searched, and a list interface about the information a is the first interface and may also be called a main interface of the browser B.

The second interface may be an interface popped up when an operation is executed on the first interface after the application program supporting activity-component-based in-application screen splitting is started. For example, if the chat application A supports activity-component-based in-application screen splitting, when the application A is started, the chat list of the application A is displayed on the screen at first, then the user required to communicate with B in the chat list execute a chat operation on the chat list, and a chat box that is popped up may be the second interface and may also be called a sub interface of the application A. In such case, the chat list and the chat box are displayed on the screen at the same time, and the user may operate the chat list and the chat box at the same time. For example, the user enters and browses the circle of friends from the bottom of the interface of the chat list and may also chat with a friend through the chat box at the same time.

For another example, if the browser B supports activity-component-based in-application screen splitting, when the browser B is started, "MIUI phone" is searched in the search interface of the browser B to display an information list about "MIUI phone", the information list is the first interface, a link in the first interface is clicked to pop up an information box corresponding to the link, and the information box may be the second interface and may also be called a sub interface of the browser B. The user may browser other information about "MIUI phone" in the first interface at the same time, and meanwhile, may also check specific information about "MIUI phone" in the second interface.

In addition, both the display area of the first interface and the display area of the second interface are less than the display area of the screen, such that the first interface and the second interface may be displayed on the screen at the same time, the condition that the second interface covers part of contents of the first interface or the first interface covers part of contents of the second interface may be avoided, the user may view two complete interfaces at the same time, and the user experience is improved.

In addition, a specific action of the screen splitting operation is not limited in the embodiments. The screen splitting operation may be an operation trajectory acting on the first interface, the second interface is popped up on the first interface according to the operation trajectory, a display content of the second interface may be the same as or different from a display content of the first interface, and the user may operate the two display interfaces at the same time.

The screen splitting operation may also be a clicking operation acting on the first interface, and if information corresponding to a clicking position is linked with information of another interface, the second interface is displayed according to the second activity component.

In the embodiments, whether the application program supports activity-component-based in-application screen splitting is determined at first, and when the activity-component-based in-application screen splitting is supported, simultaneous displaying of different activity components in the same application is implemented, such that the user, when using an application including many activity components, may start another interface without returning to a main interface from a sub interface to implement in-application screen splitting, and great conveniences and good user experience may be brought.

In an embodiment, a specific implementation flow of the operation at step S12 that the first interface of the application program is displayed according to the first activity component of the application program includes: the first interface of the application program is displayed in a center of the screen according to the first activity component.

Exemplarily, when the terminal is in the landscape state, whether the started application program supports activity-component-based in-application screen splitting is determined. When the activity-component-based in-application screen splitting is supported, the first interface of the application program is displayed in the center of the screen according to the first activity component of the application program. In such case, the user may be prompted that the application program supports in-application screen splitting, and the user performs an operation on the first interface to implement split-screen displaying of the first interface and the second interface in the application, such that the user experience is improved.

Optionally, the method further includes: after the application program is started, the first interface is displayed; and the screen splitting operation acting on the first interface is detected.

Exemplarily, when the activity-component-based in-application screen splitting is supported, the first interface of the application program may be displayed in the center of the screen according to the first activity component of the application program, and the first interface of the application program may also be displayed in a full-screen manner on the screen. If the user only browses the first interface and does not click any link in the first interface or the second interface is not required, that is, the screen splitting operation acting on the first interface is not detected, the second interface does not need to be displayed according to the second activity component, to avoid unnecessary troubles caused by misoperations to the user. Only when the screen splitting operation acting on the first interface is detected, the second interface is displayed according to the second activity component to provide split-screen displaying for the user, such that great conveniences are brought, and user experience is improved.

In an embodiment, a specific implementation flow of the operation at S12 that the first interface is displayed after the application program is started includes: the first interface is displayed in the center of the screen according to the first activity component of the application program, the display area of the first interface being less than the area of the screen.

Figure 3:
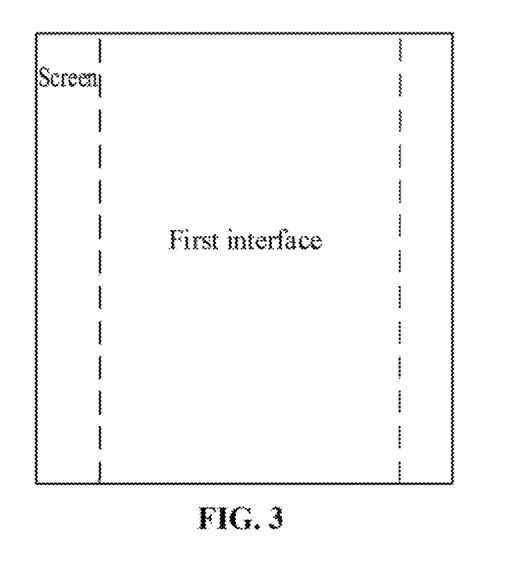
FIG. 3 is a second display interface of an application program, according to an exemplary embodiment.

For example, as illustrated in FIG. 3, when the activity-component-based in-application screen splitting is supported, the first interface of the application program is displayed in the center of the screen according to the first activity component of the application program, the display area of the first interface being less than the area of the screen. In such case, the user may be prompted that the application program supports in-application screen splitting, and the user may perform an operation on the first interface in the center for screen splitting to implement split-screen displaying of the first interface and the second interface in the application, such that the user experience is improved, and excessive non-responded operations of the user may also be avoided.

For another example, when the terminal is in the landscape state and the activity-component-based in-application screen splitting is supported, the first interface of the application program is displayed in the center of the screen according to the first activity component of the application program, the display area of the first interface being less than the area of the screen. In such case, the user may be prompted that the application program supports in-application screen splitting, such that non-responded operations of the user may be avoided.

In an embodiment, a specific implementation flow of the operation at step S12 that the first interface is displayed after the application program is started includes: after the application program is started, the first interface is displayed in a full-screen manner.

When the activity-component-based in-application screen splitting is supported, the first interface of the application program is displayed in the full-screen manner on the screen according to the first activity component of the application program, such that the user may conveniently perform an operation on the first interface. In addition, the first interface is displayed in the full-screen manner, such that a browsing view of the user for the application program is larger, the interface includes more viewable information, sliding operations of the user are reduced, the efficiency of using the application program is improved, and user experience in using the terminal is improved.

Furthermore, a specific implementation flow at step S12 can include that, when the activity-component-based in-application screen splitting is supported and the screen splitting operation is detected, the displayed first interface is reduced based on the first activity component, and the second interface of the application program is displayed according to the second activity component of the application program at the same time of displaying the first interface.

When the application program is started, the first interface is displayed in the full-screen manner, and the application supports activity-component-based in-application screen splitting, such that the displayed first interface is automatically reduced based on the first activity component when the screen splitting operation is detected. In such a manner, the second interface of the application program may be displayed according to the second activity component of the application program at the same time of displaying the first interface, that is, the two interfaces may be displayed on the screen at the same time, the condition that the second interface covers part of contents of the first interface or the first interface covers part of contents of the second interface may be avoided, the user may view two complete interfaces at the same time, and the user experience is improved.

In an embodiment, a specific implementation flow of the operation at step S12 that the second interface of the application program is displayed at the same time of displaying the first interface includes the first interface is moved to a first region of the screen for displaying according to the detected screen splitting operation acting on the first interface, and the second interface is displayed in a second region according to the second activity component of the application program, the first region and the second region being two parallel regions on the screen.

For example, the first interface is moved to an upper half screen of the screen for displaying according to the detected screen splitting operation acting on the first interface, and the second interface is displayed on a lower half screen of the screen according to the second activity component of the application program. For another example, the first interface is moved to a left half screen of the screen for displaying according to the detected screen splitting operation acting on the first interface, and the second interface is displayed on a right half screen of the screen according to the second activity component of the application program.

Display regions of interfaces may be preset to reduce operations of the user over display areas and interface positions of the interfaces and improve the screen splitting operation efficiency. Moreover, displaying in two parallel regions on the screen is more consistent with the browsing habit of the user and improves the user experience.

Optionally, display positions of the two interfaces may also be controlled to switch the activity components in the embodiments. For example, if the user does not need to switch the activity component corresponding to the second interface to be a main activity component, an operation such as link clicking or querying may be executed on the second interface to switch the second interface on the right half screen to the left half screen and switch the first interface on the left half screen to the right half screen. In such case, the activity component corresponding to the second interface is switched to be the main activity component, the user may execute another operation on the second interface, and the first interface is only configured for browsing or viewing, and the like.

In further embodiments, positions of the display regions of the first and second interfaces may also be exchanged or changed by an operation of the user, that is, the user may exchange or change the display region of the first interface and the display region of the second interface according to the browsing habit. For example, the first interface is moved to the upper half screen of the screen for displaying according to the detected screen splitting operation acting on the first interface, and the second interface is displayed on the lower half screen of the screen according to the second activity component of the application program. The user moves the first interface to the left half screen of the screen for displaying and moves the second interface to the right half screen of the screen for displaying.

Figure 4:
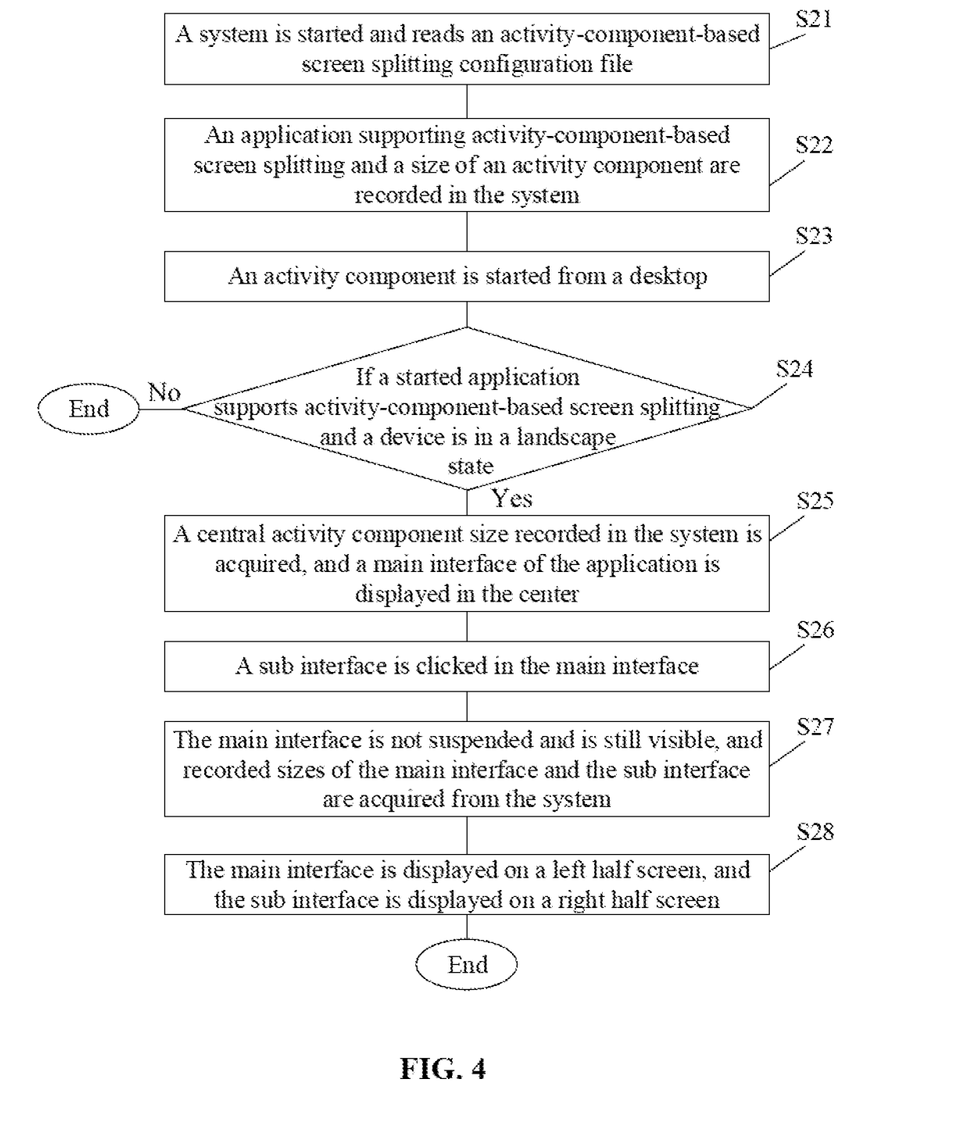
FIG. 4 is a flow chart showing another application program display method, according to an exemplary embodiment.

Exemplarily, referring to FIG. 4, another application program display method of the embodiment is illustrated.

At step S21, a system is started and reads an activity-component-based screen splitting configuration file.

At step S22, an application supporting activity-component-based screen splitting and a size of an activity component are recorded in the system.

At step S23, an activity component is started from a desktop.

At step S24, if a started application supports activity-component-based screen splitting and a device is in a landscape state, S25 is executed, otherwise operations are ended.

At step S25, a central activity component size recorded in the system is acquired, and a main interface of the application is displayed in the center.

At step S26, a sub interface is clicked in the main interface.

At step S27, the main interface is not suspended and is still visible, and recorded sizes of the main interface and the sub interface are acquired from the system.

At step S28, the main interface is displayed on a left half screen, and the sub interface is displayed on a right half screen.

The main interface may correspondingly be the first interface, and the sub interface may correspondingly be the second interface.

Figure 5:
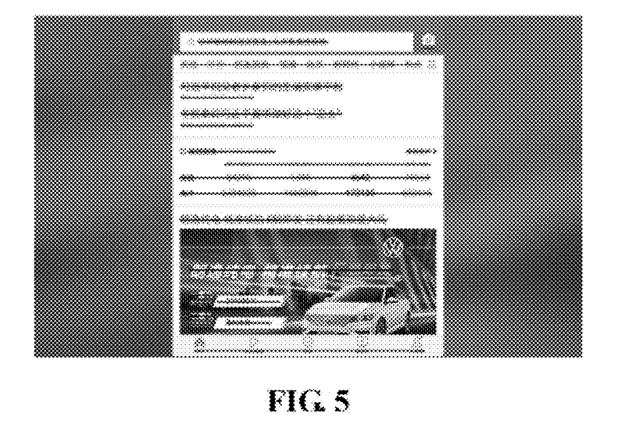
FIG. 5 is a third display interface of an application program, according to an exemplary embodiment.

Referring to FIG. 5, when the application is started, if the application supports an activity-component-based screen splitting mode and the device is presently in the landscape state, the main interface of the application is displayed in the center in a half-screen form, any sub interface in the main interface is clicked, and then each of the main interface and the sub interface may occupy a half of the screen for simultaneous displaying.

Figure 6:
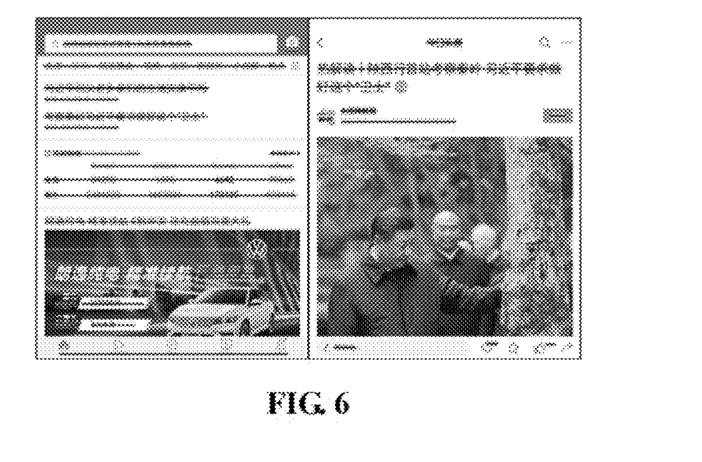
FIG. 6 is a fourth display interface of an application program, according to an exemplary embodiment.

As illustrated in FIG. 6, the two interfaces may slide at the same time without mutual influence, such that the user, when using an application including many activity components, may start another sub interface without returning to a main interface from a sub interface, and great conveniences are brought. The main interface and the sub interface may be browsed at the same time, such that better user experience is provided.

The present disclosure is applied to the terminal including the screen. Whether the application program supports activity-component-based in-application screen splitting is determined at first. When the activity-component-based in-application screen splitting is supported and the screen splitting operation is detected, the first interface of the application program is displayed according to the first activity component of the application program, and the second interface of the application program is displayed according to the second activity component of the application program at the same time of displaying the first interface, both the display area of the first interface and the display area of the second interface being less than the display area of the screen. Different activity components in the same application are displayed at the same time, in-application screen splitting is implemented, and great conveniences and good user experience may be achieved.

Figure 7:
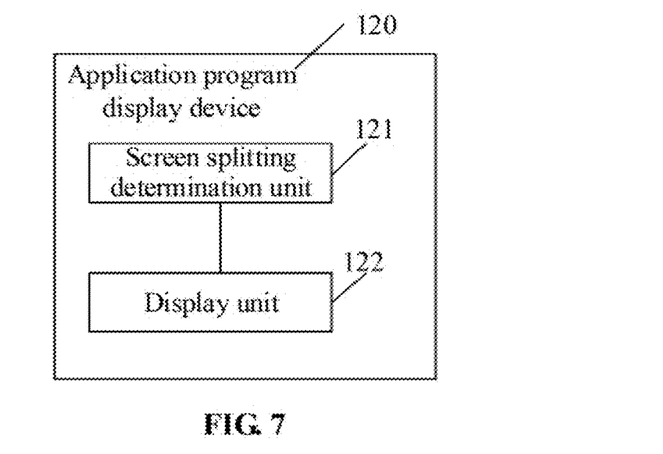
FIG. 7 is a block diagram of an application program display device, according to an exemplary embodiment.

FIG. 7 is a block diagram of an application program display device 120, according to an exemplary embodiment. Referring to FIG. 7, the device is applied to a terminal including a screen, and includes a screen splitting determination unit 121 and a display unit 122.

The screen splitting determination unit 121 is configured to determine whether an application program supports activity-component-based in-application screen splitting.

The display unit 122 is configured to, when the activity-component-based in-application screen splitting is supported and a screen splitting operation is detected, display a first interface of the application program according to a first activity component of the application program and display a second interface of the application program according to a second activity component of the application program at same time of displaying the first interface, both a display area of the first interface and a display area of the second interface being less than a display area of the screen.

Optionally, the screen splitting determination unit 121 is further configured to, when an operating system of the terminal is started, load a configuration file of supporting activity-component-based in-application screen splitting in a system memory, the configuration file recording information of an application program supporting activity-component-based in-application screen splitting.

The screen splitting determination unit 121 is specifically configured to, when the application program is started, query the configuration file to determine whether the application program supports activity-component-based in-application screen splitting.

Optionally, the screen splitting determination unit 121 is specifically configured to, when the operating system of the terminal is started, according to the configuration file, record identification information of the application program supporting activity-component-based in-application screen splitting in the system memory and set display areas of interfaces corresponding to multiple activity components in the application program.

Additionally, the screen splitting determination unit 121 can be further configured to determine whether the terminal is in a landscape state. The screen splitting determination unit 121 can be specifically configured to, when the terminal is in the landscape state, determine whether a started application program supports activity-component-based in-application screen splitting.

Optionally, the display unit 122 is specifically configured to, display the first interface of the application program in a center of the screen according to the first activity component. Further, the display unit 122 can be further configured to, after the application program is started, display the first interface; and detect the screen splitting operation acting on the first interface.

Optionally, the display unit 122 is specifically configured to, display the first interface in a center of the screen according to the first activity component of the application program, the display area of the first interface being less than the area of the screen. Additionally, the display unit 122 can be specifically configured to, after the application program is started, display the first interface in a full-screen manner.

The display unit 122 is further specifically configured to, when the activity-component-based in-application screen splitting is supported and the screen splitting operation is detected, reduce the displayed first interface based on the first activity component and display the second interface of the application program according to the second activity component of the application program at the same time of displaying the first interface.

Optionally, the display unit 122 is specifically configured to, move the first interface to a first region of the screen for displaying according to the detected screen splitting operation acting on the first interface and display the second interface in a second region according to the second activity component of the application program, the first region and the second region being two parallel regions on the screen.

With respect to the device in the above embodiment, the specific manners for performing operations for individual units therein have been described in detail in the embodiments regarding the method, which will not be repeated herein.

Figure 8:
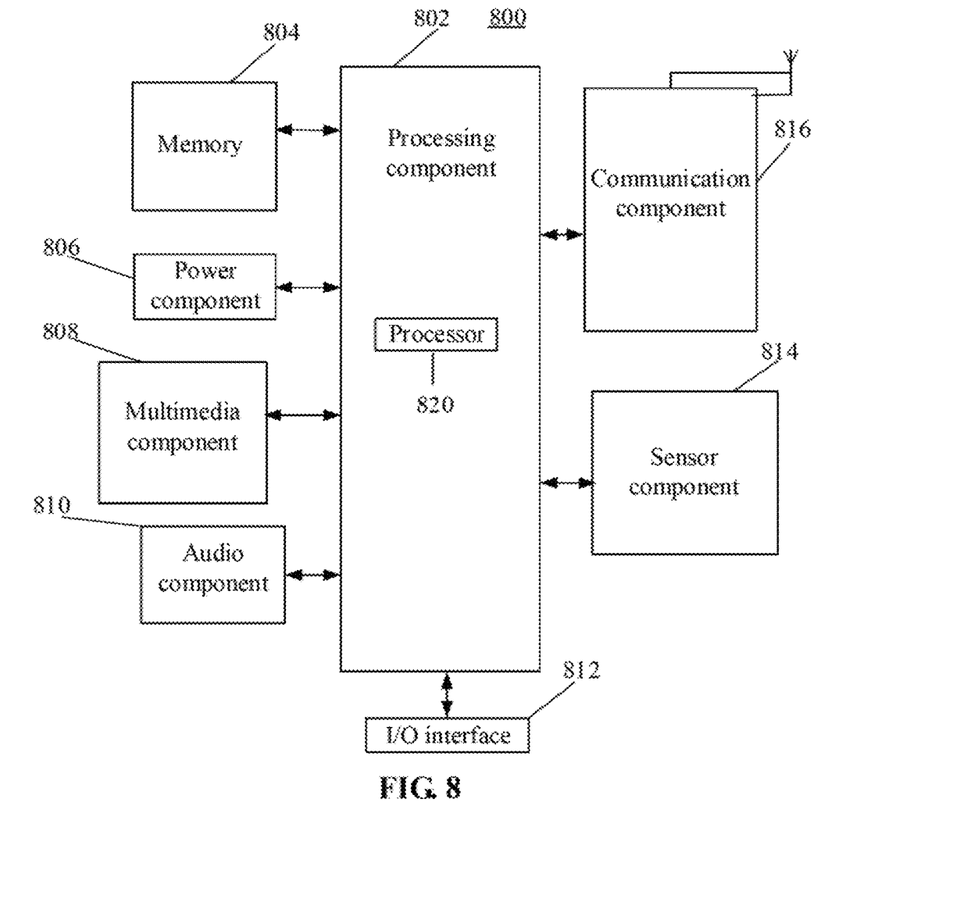
FIG. 8 is a hardware structure block diagram of an application program display device, according to an exemplary embodiment.

FIG. 8 is a block diagram of an application program display device 800, according to an exemplary embodiment. For example, the device 800 may be a mobile phone, a computer, a digital broadcast terminal, a messaging device, a gaming console, a tablet, a medical device, exercise equipment, a personal digital assistant, and the like.

Referring to FIG. 8, the device 800 may include one or more of the following components: a screen, a processing component 802, a memory 804, a power component 806, a multimedia component 808, an audio component 810, an input/output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the abovementioned method. Moreover, the processing component 802 may include one or more modules which facilitate interaction between the processing component 802 and other components. For instance, the processing component 802 may include a multimedia module to facilitate interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, etc. The memory 804 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 806 provides power for various components of the device 800. The power component 806 may include a power management system, one or more power supplies, and other components associated with generation, management and distribution of power for the device 800.

The multimedia component 808 includes a screen providing an output interface between the device 800 and a user. In some embodiments, the screen may include a liquid crystal display (LCD) and a touch panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a period of time and a pressure associated with the touch or swipe action. In some embodiments, the multimedia component 808 includes a front camera and/or a rear camera. The front camera and/or the rear camera may receive external multimedia data when the device 800 is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 includes a microphone (MIC), and the MIC is configured to receive an external audio signal when the device 800 is in an operation mode, such as a call mode, a recording mode and a voice recognition mode. The received audio signal may further be stored in the memory 804 or sent through the communication component 816. In some embodiments, the audio component 810 further includes a speaker configured to output the audio signal.

The I/O interface 812 provides an interface between the processing component 802 and peripheral interface modules, such as a keyboard, a click wheel, buttons, and the like. The buttons may include, but are not limited to a home button, a volume button, a starting button, and a locking button.

The sensor component 814 includes one or more sensors configured to provide status assessments in various aspects for the device 800. For instance, the sensor component 814 may detect an on/off status of the device 800 and relative positioning of components, such as a display and small keyboard of the device 800, and the sensor component 814 may further detect a change in a position of the device 800 or a component of the device 800, presence or absence of contact between the user and the device 800, orientation or acceleration/deceleration of the device 800 and a change in temperature of the device 800. The sensor component 814 may include a proximity sensor configured to detect presence of an object nearby without any physical contact. The sensor component 814 may also include a light sensor, such as a complementary metal oxide semiconductor (CMOS) or charge coupled device (CCD) image sensor, configured for use in an imaging application. In some embodiments, the sensor component 814 may also include an acceleration sensor, a gyroscope sensor, a magnetic sensor, a pressure sensor or a temperature sensor.

The communication component 816 is configured to facilitate wired or wireless communication between the device 800 and other devices. The device 800 may access any communication-standard-based wireless network, such as a Wi-Fi network, a 2nd-generation (2G) or 3rd-generation (3G) network or a combination thereof. In an exemplary embodiment, the communication component 816 receives a broadcast signal or broadcast associated information from an external broadcast management system through a broadcast channel. In an exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wide band (UWB) technology, a Bluetooth (BT) technology, and other technologies.

In an exemplary embodiment, the device 800 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, and is configured to execute the abovementioned method.

In an exemplary embodiment, there is also provided a non-transitory computer-readable storage medium including instructions, such as included in the memory 804, executable by the processor 820 of the device 800 for performing the abovementioned methods. For example, the non-transitory computer-readable storage medium may be a ROM, a random access memory (RAM), a compact disc read-only memory (CD-ROM), a magnetic tape, a floppy disc, an optical data storage device, and the like.

According to a non-transitory computer-readable storage medium, when instructions in the storage medium are executed by a processor of a mobile terminal to cause the mobile terminal to execute an application program display method applied to a terminal including a screen. The method can include determining whether an application program supports activity-component-based in-application screen splitting, and, in response to the activity-component-based in-application screen splitting being supported and a screen splitting operation being detected, a first interface of the application program is displayed according to a first activity component of the application program, and a second interface of the application program is displayed according to a second activity component of the application program at same time of displaying the first interface, both a display area of the first interface and a display area of the second interface being less than a display area of the screen.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. An application program display method that is applied to a terminal with a screen, the method comprising:
   loading a configuration file in a system memory of the terminal when an operating system of the terminal is started, the configuration file recording information of a supporting application program that supports activity-component-based in-application screen splitting;
   determining whether an application program supports the activity-component-based in-application screen splitting by querying the configuration file when the application program is started;
   displaying, after the application program is started, a first user interface providing a first user interaction with the application program based on a first activity component of the application program, and detecting a screen splitting operation acting on the first user interface; and
   when the first user interface is displayed on the screen and the application program is determined as supporting the activity-component-based in-application screen splitting, and in response to the screen splitting operation being detected,
displaying a second user interface providing a second user interaction with the application program based on a second activity component of the application program on the screen while keeping the first user interface displayed on the screen, a combined display area of the first user interface and the second user interface being less than a display area of the screen,
wherein the configuration file comprises:
display areas of interfaces corresponding to multiple activity components in the application program, and the display areas of the interfaces corresponding to the multiple activity components in the application program comprises
a first display area of each interface corresponding to each activity component when the activity-component-based in-application screen splitting is not executed after the application program is started, and
a second display area of each interface corresponding to each activity component when the activity-component-based in-application screen splitting is being executed after the application program is started; and
a display region of each interface corresponding to each activity component when the activity-component-based in-application screen splitting is being executed after the application program is started.

2. The application program display method of claim 1, wherein the loading the configuration file in the system memory further comprises:
recording, according to the configuration file, identification information of the supporting application program that supports the activity-component-based in-application screen splitting in the system memory when the operating system of the terminal is started; and
setting display areas of interfaces corresponding to multiple activity components in the supporting application program according to the configuration file.

3. The application program display method of claim 1, further comprising:
determining whether the terminal is in a landscape state,
wherein the determining whether the application program supports the activity-component-based in-application screen splitting further includes determining whether the application program supports activity-component-based in-application screen splitting when the terminal is in the landscape state.

4. The application program display method of claim 1, further comprising:
displaying the first user interface in a center of the screen prior to the screen splitting operation being detected.

5. The application program display method of claim 1, wherein displaying the first user interface after the application program is started further comprises:
displaying the first user interface in a center of the screen, a display area of the first user interface being less than the display area of the screen.

6. The application program display method of claim 1, wherein
the displaying the first user interface after the application program is started further comprises displaying the first user interface in a full-screen manner after the application program is started, and
the displaying the second user interface on the screen while keeping the first user interface displayed on the screen comprises reducing a display area of the displayed first user interface on the screen.

7. The application program display method of claim 6, wherein the displaying the second user interface on the screen while keeping the first user interface displayed on the screen comprises:
moving the first user interface to a first region of the screen for displaying; and
displaying the second user interface in a second region, the first region and the second region being two parallel regions on the screen.

8. An application program display device that is a terminal, the device comprising:
a screen;
a processor; and
a memory for storing instructions executable by the processor,
wherein the processor is configured to:
load a configuration file in a system memory of the terminal when an operating system of the terminal is started, the configuration file recording information of a supporting application program that supports activity-component-based in-application screen splitting;
determine whether an application program supports the activity-component-based in-application screen splitting by querying the configuration file when the application program is started;
display, after the application program is started, a first user interface providing a first user interaction with the application program based on a first activity component of the application program, and detect a screen splitting operation acting on the first user interface; and
when the first user interface is displayed on the screen and the application program is determined as supporting the activity-component-based in-application screen splitting, and in response to a screen splitting operation being detected,
display a second user interface providing a second user interaction with the application program based on a second activity component of the application program on the screen while keeping the first user interface displayed on the screen, a combined display area of the first user interface and the second user interface being less than a display area of the screen,
wherein the configuration file comprises:
display areas of interfaces corresponding to multiple activity components in the application program, and the display areas of the interfaces corresponding to the multiple activity components in the application program comprises
a first display area of each interface corresponding to each activity component when the activity-component-based in-application screen splitting is not executed after the application program is started, and
a second display area of each interface corresponding to each activity component when the activity-component-based in-application screen splitting is being executed after the application program is started; and
a display region of each interface corresponding to each activity component when the activity-componentbased in-application screen splitting is being executed after the application program is started.

9. The application program display device of claim 8, wherein the processor is configured to:
  record identification information of the supporting application program that supports the activity-component-based in-application screen splitting in the system memory; and
  set display areas of interfaces corresponding to multiple activity components in the supporting application program according to the configuration file.

10. The application program display device of claim 8, wherein the processor is further configured to:
  determine whether the terminal is in a landscape state; and
  determine whether the application program supports the activity-component-based in-application screen splitting when the terminal is in the landscape state.

11. The application program display device of claim 8, wherein the processor is configured to display the first user interface in a center of the screen prior to the screen splitting operation being detected.

12. The application program display device of claim 8, wherein the processor is configured to
  display the first user interface in a center of the screen, a display area of the first user interface being less than the display area of the screen.

13. The application program display device of claim 8 wherein the processor is configured to:
  display the first user interface in a full-screen manner after the application program is started; and
  display the second user interface on the screen while keeping the first user interface displayed on the screen by reducing a display area of the displayed first user interface on the screen.

14. The application program display device of claim 13, wherein the processor is configured to display the second user interface on the screen while keeping the first user interface displayed on the screen by:
  moving the first user interface to a first region of the screen for displaying; and
  displaying the second user interface in a second region, the first region and the second region being two parallel regions on the screen.

15. A non-transitory computer-readable storage medium, instructions in the storage medium being executed by a processor of a terminal to cause the terminal to execute an application program display method, the method comprising:

loading a configuration file in a system memory of the terminal when an operating system of the terminal is started, the configuration file recording information of a supporting application program that supports activity-component-based in-application screen splitting;

determining whether an application program supports the activity-component-based in-application screen splitting by querying the configuration file when the application program is started;

displaying, after the application program is started, a first user interface providing a first user interaction with the application program based on a first activity component of the application program, and detecting a screen splitting operation acting on the first user interface; and when the first user interface is displayed on a screen of the terminal and the application program is determined as supporting the activity-component-based in-application screen splitting, and in response to the screen splitting operation being detected,
  displaying a second user interface providing a second user interaction with the application program based on a second activity component of the application program on the screen while keeping the first user interface displayed on the screen, a combined display area of the first user interface and the second user interface being less than a display area of the screen, wherein the configuration file comprises:
  display areas of interfaces corresponding to multiple activity components in the application program, and the display areas of the interfaces corresponding to the multiple activity components in the application program comprises
    a first display area of each interface corresponding to each activity component when the activity-component-based in-application screen splitting is not executed after the application program is started, and
    a second display area of each interface corresponding to each activity component when the activity-component-based in-application screen splitting is being executed after the application program is started; and
  a display region of each interface corresponding to each activity component when the activity-component-based in-application screen splitting is being executed after the application program is started.

* * * * *